United States Patent
Lu et al.

(10) Patent No.: US 10,039,110 B2
(45) Date of Patent: Jul. 31, 2018

(54) METHODS AND APPARATUSES FOR DEVICE-TO-DEVICE COMMUNICATION

(71) Applicant: Telefonaktiebolaget LM Ericsson (publ), Stockholm (SE)

(72) Inventors: Qianxi Lu, Beijing (CN); Qingyu Miao, Beijing (CN); Zhenshan Zhao, Beijing (CN)

(73) Assignee: TELFONAKTIEBOLAGET LM ERICSSON (PUBL), Stockholm (SE)

( * ) Notice: Subject to any disclaimer, the term of this patent is extended or adjusted under 35 U.S.C. 154(b) by 122 days.

(21) Appl. No.: 15/032,968

(22) PCT Filed: Oct. 31, 2013

(86) PCT No.: PCT/CN2013/086315
§ 371 (c)(1),
(2) Date: Apr. 28, 2016

(87) PCT Pub. No.: WO2015/062020
PCT Pub. Date: May 7, 2015

(65) Prior Publication Data
US 2016/0255617 A1   Sep. 1, 2016

(51) Int. Cl.
*H04W 4/00* (2018.01)
*H04W 72/04* (2009.01)
(Continued)

(52) U.S. Cl.
CPC ....... *H04W 72/048* (2013.01); *H04W 72/042* (2013.01); *H04W 76/023* (2013.01);
(Continued)

(58) Field of Classification Search
CPC . H04W 72/048; H04W 72/042; H04W 76/14; H04W 92/18; H04W 76/023; H04W 88/06
See application file for complete search history.

(56) References Cited

U.S. PATENT DOCUMENTS

| 2010/0165882 A1* | 7/2010 | Palanki | H04W 76/023 370/254 |
| 2013/0148637 A1* | 6/2013 | Yang | H04W 72/042 370/336 |

(Continued)

FOREIGN PATENT DOCUMENTS

| CN | 102026307 A | 4/2011 |
| CN | 103024911 A | 4/2013 |

(Continued)

OTHER PUBLICATIONS

Samsung, "Evaluation on WAN Impact of D2D Discovery", 3GPP TSG RAN WG1 Meeting #74bis, R1-134191, Samsung, Guangzhou, China, Oct. 7-11, 2013, pp. 1-7.

(Continued)

*Primary Examiner* — Phuc Tran
(74) *Attorney, Agent, or Firm* — Murphy, Bilak & Homiller, PLLC

(57) ABSTRACT

Methods and apparatuses for device-to-device (D2D) communication are provided. In an method, configuration messages including configuration information with respect to a control channel for the D2D communication is generated (S201) and the configuration messages are transmitted (S202) to user equipments that support D2D communication. With the methods and apparatuses, resources used for D2D control channel are reasonably allocated to explore diversity gain or reduce interference.

10 Claims, 4 Drawing Sheets

(51) Int. Cl.
*H04W 76/14* (2018.01)
*H04W 88/06* (2009.01)
*H04W 76/02* (2009.01)
*H04W 92/18* (2009.01)

(52) U.S. Cl.
CPC ............ *H04W 76/14* (2018.02); *H04W 88/06* (2013.01); *H04W 92/18* (2013.01)

(56) References Cited

U.S. PATENT DOCUMENTS

| 2013/0150061 | A1  | 6/2013 | Shin et al. |           |
|--------------|-----|--------|-------------|-----------|
| 2014/0018010 | A1* | 1/2014 | Gao .................... | H04W 72/085 455/67.13 |
| 2014/0198694 | A1* | 7/2014 | Yang ................... | H04W 52/242 370/311 |
| 2015/0085772 | A1* | 3/2015 | Seo .................... | H04W 72/042 370/329 |
| 2015/0222401 | A1* | 8/2015 | Xu ..................... | H04W 76/023 370/329 |

FOREIGN PATENT DOCUMENTS

| JP | 2014504814 A  | 2/2014 |
| WO | 2012075630 A1 | 6/2012 |
| WO | 2012088470 A1 | 6/2012 |
| WO | 2013000245 A1 | 1/2013 |
| WO | 2013026359 A1 | 2/2013 |

OTHER PUBLICATIONS

Alcatel-Lucent Shanghai Bell et al., "Resource Allocation for D2D Communication", 3GPP TSG RAN WG1 Meeting #74bis, R1-134230, Alcatel-Lucent, Guangzhou, P.R. China, Oct. 7-11, 2013, pp. 1-3.

ZTE, "Control Channel Design for D2D communication", 3GPP TSG-RAN WG1 Meeting #74bis, R1-134307, ZTE, Guangzhou, China, Oct. 7-11, 2013, pp. 1-5.

* cited by examiner

METHODS AND APPARATUSES FOR DEVICE-TO-DEVICE COMMUNICATION

TECHNICAL FIELD

The non-limiting and exemplary embodiments of the present disclosure herein relate to a wireless communication field. In particular, the embodiments herein relate to methods and apparatuses for device-to-device (D2D) communication.

BACKGROUND

Recent developments of the 3GPP Long Term Evolution (LTE) facilitate accessing local IP based services in the home, office, public hot spot or even outdoor environments. One of the important use cases for the local IP access and local connectivity involves the direct communication between devices in the close proximity (typically less than a few 10s of meters, but sometimes up to a few hundred of meters) of each other, an exemplary scenario of which is shown in FIG. 1. As illustrated in FIG. 1, in addition to communications with the BS, two D2D enabled user equipments (UEs) 1 and 2 are also engaging in direct communication with one another. Because D2D enabled UEs are much closer to one another than cellular devices that have to communicate via a cellular access point (e.g., BS or eNB), such a direct mode (or called D2D mode) enables a number of potential gains over the traditional cellular techniques as follows:

capacity gain: First, radio resources (e.g., orthogonal frequency division multiplexing (OFDM) resource blocks) between the D2D and cellular layers may be reused (reuse gain). Second, a D2D link uses a single hop between the transmitter and receiver points as opposed to a 2-hop link via a cellular access point (hop gain).

peak rate gain: Due to the proximity and potentially favorable propagation conditions, high peak rates could be achieved (proximity gain);

latency gain: When the UEs communicate over a direct link or, in other words, in a D2D mode, eNB forwarding is short cut and the end-to-end latency may be decreased.

From the perspective of network coverage availability, D2D communication may be divided into two scenarios, i.e., a network assisted (NWA) case and a non-NW assisted (nNWA) case. In the NWA case, it is possible that the scheduling of D2D communication is controlled by the network, which implements contention-free access schemes. However, the disadvantages in this case are obvious, e.g., it needs a large number of feedbacks about the radio link quality from the D2D enabled UEs to the network, which will cause signaling overhead in the system, especially considering the possible large number of devices in the future system. In the nNWA case, D2D enabled UE transmitters may get the radio link quality information locally, based upon which it may also decide the resource usage details autonomously. These resource usage details include all possible radio resource management (RRM) related aspects, e.g., a modulating and coding scheme (MCS), physical resource block (PRB) positions, power control and etc. In this way, the signaling overhead may be reduced and it relaxes the burden of the central scheduler. However, all these may only be realized under contention-based access schemes. Therefore, how to efficiently convey control/scheduling information from a D2D enabled UE transmitter (i.e., transmitting party) to a D2D enabled UE receiver (i.e., receiving party) without considering the access schemes needs to be addressed.

In the framework of "Flashlinq: A Synchronous Distributed Scheduler for Peer-to-Peer Ad Hoc Networks" as proposed by Xinzhou W U et al., a distributed RRM scheme for D2D communication is proposed. However, this scheme mainly solves the problem of link scheduling, i.e., which D2D link is allowed to access, and does not mention any details in regards to conveying the control information, which would relate to the instant decision of a PRB selection, an MCS, HARQ setting, and etc, from the D2D enabled UE transmitter to the D2D enabled UE receiver. Furthermore, the co-existence problem between D2D channels and cellular channels, as discussed below, is out of the scope in Flashlinq's design.

According to the current discussion status in the 3GPP on the D2D communication, it is widely agreed that the D2D communication may reuse the cellular uplink (UL) resources, including both UL bands for frequency division duplex (FDD) and UL subframes for time division duplex (TDD). This means that the D2D control or data channels and cellular data or control channels (e.g., physical uplink shared channel (PUSCH), physical uplink control channel (PUCCH)) may coexist in the same bands/subframes. It makes the design of the D2D control channel more complicated, i.e., an efficient interference coordination scheme should be taken into account. Therefore, how to determine/map the control channel resource for each D2D link and how the control channel configurations may be known by both D2D enabled UE transmitter and receiver are key factors in designing the D2D control channel.

SUMMARY

It is an object of the present disclosure to address at least one of the problems outlined above, and to provide a solution for configuring and allocating resource directed to the D2D control channel and informing the D2D enabled UEs of this resource configuration or allocation. This object may be obtained by providing methods and apparatuses for D2D communications.

According to an aspect of the disclosure, there is provided a method for D2D communication. The method comprises generating configuration messages including configuration information with respect to a control channel for the D2D communication. The method further comprises transmitting the configuration messages to user equipments that support D2D communication.

In one embodiment, the configuration information includes information regarding a resource pool allocated for the control channel.

In another embodiment, the information regarding the resource pool includes information regarding frequency domain locations and time domain locations allocated for the control channel.

In an additional embodiment, the frequency domain locations are allocated such that in-band emission from cellular communication is avoided or the frequency domain locations are allocated such that a diversity gain is obtained.

In a further embodiment, the configuration information includes one of resource allocation information for a direct selection of the control channel or resource allocation parameter information based upon which the control channel is selected by the user equipments.

In an embodiment, the resource allocation parameter information at least includes service type information, hopping pattern parameter information or mapping function parameter information, wherein the mapping function establishes mapping relationships between identifiers of the user equipments and the control channel.

In another embodiment, the transmitting of the configuration messages is performed for enabling the user equipment to establish D2D communication with another user equipment using the control channel.

According to another aspect of the disclosure, there is provided a method for D2D communication. The method comprises receiving, at a user equipment that supports the D2D communication, a configuration message that includes configuration information with respect to a control channel for the D2D communication. The method further comprises establishing the D2D communication with another user equipment using the control channel.

In an embodiment, the method further comprises performing a blind detection based upon the configuration information to determine resource used by the control channel.

According to an aspect of the disclosure, there is provided an apparatus for D2D communication. The apparatus comprises a generator configured to generate configuration messages including configuration information with respect to a control channel for the D2D communication. The apparatus further comprises a transmitter configured to transmit the configuration messages to user equipments that support D2D communication.

According to another aspect of the disclosure, there is provided an apparatus for D2D communication. The apparatus comprises a receiver configured to receive a configuration message that includes configuration information with respect to a control channel for the D2D communication. The apparatus further comprises an establishing unit configured to establish the D2D communication with another user equipment using the control channel.

By means of solutions discussed in the various aspects and embodiments as mentioned above, the control channel for the D2D communication may be configured and the configuration may be known and used by the D2D enabled UEs for reasonable selection of the control channel. Further, by properly allocating the frequency and time domain resource positions (see examples as illustrated in FIGS. 3a and 3b), the diversity gain or decreased interference from the cellular communication may be achieved. In addition, based upon multiple inputs, such as various parameters, the resource of link-specific D2D control channel may be accurately calculated and selected. Furthermore, due to proper configurations and indications, the size of the D2D control channel may be changed dynamically according to the traffic load of the D2D enabled UEs, thereby improving spectrum efficiency.

BRIEF DESCRIPTION OF THE DRAWINGS

Embodiments will now be described in more detail in relation to the enclosed drawings, in which.

DETAILED DESCRIPTION

The present disclosure will now be described more fully hereinafter with reference to the accompanying drawings, in which certain embodiments of the present disclosure are shown. This disclosure may, however, be embodied in many different forms and should not be construed as limited to the embodiments set forth herein; rather, these embodiments are provided by way of example so that this disclosure will be thorough and complete, and will fully convey the scope of the present disclosure to those skilled in the art. Like numbers refer to like elements throughout the specification.

Generally, all terms used in the claims are to be interpreted according to their ordinary meaning in the technical field, unless explicitly defined otherwise herein. For example, the communication terminal may be any suitable wireless communication terminal or UE, such as a mobile phone or a portable computer. Below, reference is often made to a D2D enabled UE, that is, a UE that supports the D2D communication. However, this should not limit the present disclosure to any specific communication standard. Rather, the terms UE and communication terminal may be regarded as essentially synonymous, unless conflicting with the context. Likewise, the BS may be any suitable radio BS, according to any suitable communication standard, such as a Node B or an eNode B.

All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The discussion above and below in respect of any of the aspects of the present disclosure is also in applicable parts relevant to any other aspect of the present disclosure.

Figure 2:
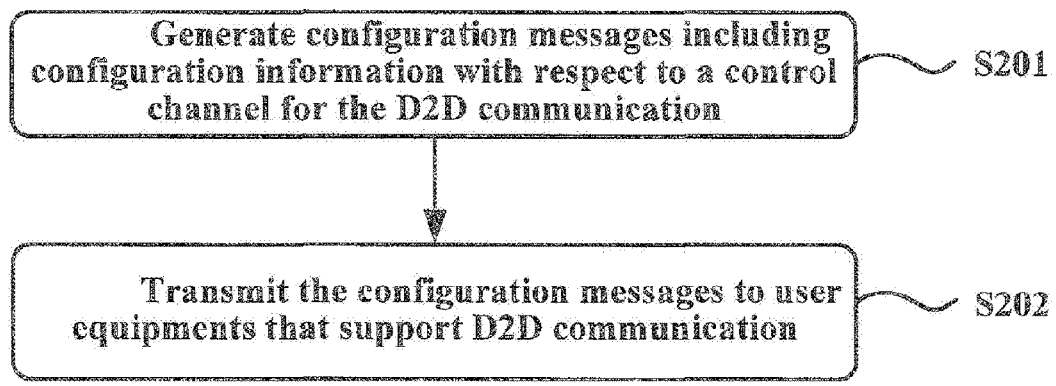
FIG. 2 is a flowchart of a method for D2D communication from a BS's point of view.

FIG. 2 is a flowchart of a method 200 for D2D communication from e.g., a BS's point of view. As illustrated in FIG. 2, at step S201, the method 200 generates configuration messages including configuration information with respect to a control channel for the D2D communication. The generating step may take place at any suitable time such as after verification of the D2D enabled UE, or after registration with the Network, or before D2D communication is initiated, as non-limiting examples.

In an embodiment, the configuration information includes information regarding a resource pool allocated for the control channel, which would be referred to as the direct access control channel (DACCH) throughout this specification. In a further embodiment, the information regarding the resource pool includes information regarding frequency domain locations and time domain locations allocated for the DACCH.

Figure 3A:
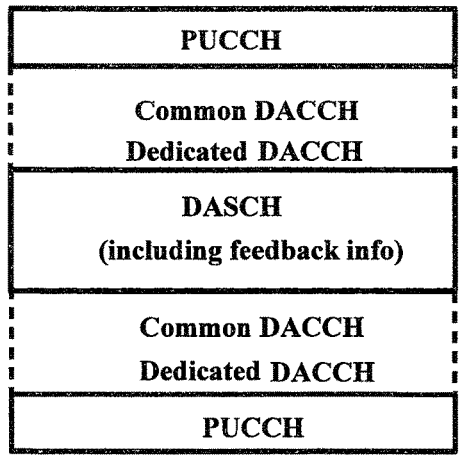
FIGS. 3a-3c are diagrams exemplarily illustrating mapping of the D2D control channels to the physical resources according to embodiments of the present disclosure.
Figure 3B:
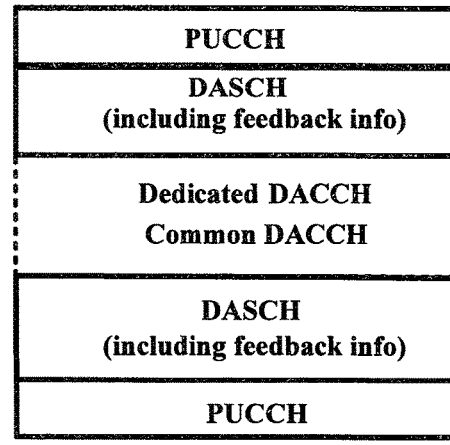

With respect to the frequency domain locations, as stated before, a DACCH would co-exist with a cellular UL channel in cellular UL resources. In terms of the interference from/to cellular data channels, PUSCH is easier to deal with by scheduling. However, PUCCH, which is located at a band edge, is hard to be fully removed due to acknowledgement/non-acknowledgement feedback triggered by cellular DL activities. Hence, considering the in-band emission characteristics of UE transmitters, PUCCH (at a band edge) would cause severe in-band emission at nearby RBs, at a band center (due to carrier leakage) and the other side of band edge (due to IQ Image). To avoid the in-band emission while considering the resource efficiency, it is proposed to use a configurable DACCH resource location, e.g., the locations as follows:

at a band edge, next to the PUCCH at both sides of bandwidth, to obtain a diversity gain and keep the continuity of bandwidth for data transmission (which is preferred by a single carrier-frequency division multiple access (SC-FDMA) interface of the UE transmitter), as shown in FIG. 3a, as an non-limiting example; or nearby a band center, to obtain the largest margin between PUCCHs, but not at the very center to avoid the carrier leakage, as shown in FIG. 3b as an non-limiting example.

From the above discussions with respect to the frequency resource allocation, it may be seen that the frequency domain locations according to the embodiments are allocated such that in-band emission from cellular communication is avoided or the frequency domain locations are allocated such that a diversity gain is obtained. Further, it should be noted that the frequency allocation for the DACCH as depicted in FIGS. 3a and 3b are only illustrative of some possible allocation manners and a person skilled in the art may make some changes or modifications to these depicted examples as long as the resulting frequency domain locations may obtain the diversity gain or avoid the in-band emission from the cellular communication.

Regarding the time domain locations, to save UE power consumption for DACCH monitoring, the DACCH may be located at a limited number of subframes such that receivers may omit the other subframes in a discontinuous reception (DRX) mode for power saving.

In addition to the frequency and time domain divisions, within the resource pool, DACCH resources may be further divided into more than one subset. For example, as illustrated in FIGS. 3a and 3b, the DACCH resources may be further divided into common control channel regions and dedicated control channel regions with different functionality respectively. For instance, the common DACCH region is used for group-cast/broadcast traffic (either for user plane or control plane). Alternatively, two different broadcast/group subsets of the common DACCH region are used for the group-cast traffic and the broadcast traffic respectively. The dedicated DACCH is used for unicast traffic (either for user plane or control plane).

Also the DACCH resource pool may be divided into contention-free and contention-based subsets. For example, in the contention-free subset, the network would allocate the DACCH resource for each D2D enabled UE transmitter to avoid collision. In contrast, in the contention-based subset, the D2D enabled UE transmitter would autonomously select a DACCH resource from the pool for its control signaling transmission.

Returning back to the flow, at step S202, the method 200 transmits the configuration messages to UEs that support D2D communication. To complete effective resource allocation and scheduling, it seems necessary to use configuration signaling designed as common signaling for different D2D links to convey the resource pool information, i.e., DACCH time/frequency resource locations/size/subset division to the D2D enabled UEs.

The required signaling or approach to deliver the resource pool information may be exampled as follows:

Network (NW) signaling, which is broadcasted and may be included in DL broadcast/dedicated signaling to all D2D UEs by the network. For example, a new configuration channel for the DACCH resource pool locations in the DL resource of network and the position of this new configuration channel are predefined or broadcasted by the network such that all D2D enabled UEs within coverage of the network know about it.

Figure 3C:
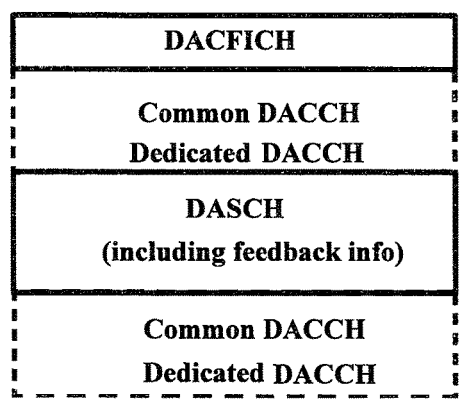

Cluster head signaling, which is broadcasted by a cluster heard through e.g., a physical device-to-device synchronization channel (PD2DSCH). Alternatively, it is sent on an independent channel on the UL resources, e.g., a direct access control format indicator channel (DACFICH)) as shown in FIG. 3c, whose position is known by all D2D enabled UEs (predefined or by the network signaling). It would be better to put DACFICH next to the DACCH so that the resource fragment may be reduced.

UE relayed signaling. To enable the out-of-cell/cluster UEs to obtain the information from the network (e.g., eNB)/cluster head, some cell/cluster-edge UEs may play a role of a relay node and relay the signaling from the eNB/cluster head in the above network signaling and cluster head signaling scenarios to a D2D enabled UE.

Predefined positions of the DACCH resource. In case there is no network and the cluster head, D2D enabled UE may assume that the DACCH resource lies at some predefined/standardized positions, which are known by all D2D enabled UEs.

From the above examples, it may be seen that the transmitting of the configuration messages to D2D enabled UEs at step S202 may be performed by a BS via one of a broadcast signaling message or a dedicated signaling message, or performed by a cluster header via a broadcast signaling message, or performed by a relay UE via a relay signaling message at any suitable time, such as when the D2D enabled UEs register with the network or after the UEs send their capability information to the network. Further, by introducing resource allocation information such as those carried by the DACFICH, it would be easy for the D2D enabled UE to determine and select a proper DACCH to enable the D2D communication with another D2D enabled UE.

According to the descriptions made above with reference to FIGS. 2 and 3a-3b, it is to be understood that the embodiments of the present disclosure provide resource pool allocation and notification mechanism with respect to the DACCH. By virtue of this mechanism, information regarding the resources occupied by the DACCH could be configurable by the network or the cluster head, sent by the network on DL resources, or sent by the cluster head on the UL resources, or relayed by cell/cluster-edge UEs.

Figure 4:
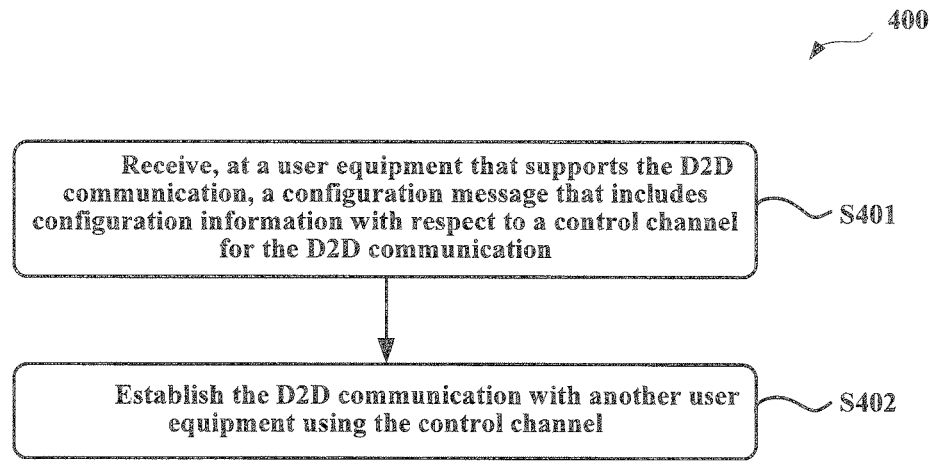
FIG. 4 is a flowchart of a method for D2D communication from a D2D-enabled UE's point of view.

FIG. 4 is a flowchart of a method 400 for D2D communication from a D2D-enabled UE's point of view. As illustrated in FIG. 4, at step S401, the method 400 receives, at a UE that supports the D2D communication, a configuration message that includes configuration information with respect to a control channel for the D2D communication. The configuration message is the same as the one generated at step S201 and transmitted at step S202 as illustrated in FIG. 2; thus, the description in regards to the configuration message is omitted herein for simplified purposes. Upon receipt of the configuration message, at step S402, the method 400 establishes the D2D communication with another UE (i.e., D2D enabled UE) using the control channel, for example DACCH as named by the present disclosure.

According to embodiments of the present disclosure, after obtaining the knowledge of locations of DACCH resource pool, each D2D link may select a single DACCH resource to use between a specific pair of D2D enabled UEs based upon, e.g., the contention-free or contention-based method. How to make the D2D enabled UE transmitting party and receiving party aware of this selection needs to be addressed. To this end, the embodiments of the present disclosure propose using the following approaches to select a propose DACCH:

NW common/dedicated configuration signaling, which may be implemented in different forms.

In the extreme case, it is incumbent upon the NW to transmit dedicated signaling which may include resource allocation information to each D2D link to enable a direct selection of the DACCH resources.

Alternatively, the NW may transmit broadcast/dedicated signaling to indicate DACCH resources implicitly. For example, the NW may indicate the setting of hopping pattern parameter, or the parameter of the mapping function from identifiers of the D2D enabled UEs to DACCH (as stated in the following case). That is, the NW may transmit the resource allocation parameter information to the D2D enabled UE to facilitate the selection of the control channel.

Identifiers (IDs) of the specific pair of D2D enabled UE included in a discovery beacon, which may be used to calculate a single DACCH position according to the above-mentioned mapping function, which establishes mapping relationships between identifiers of the D2D enabled UEs and the control channel.

Prior to the data transmission, the transmitting party's ID may be known by the receiving party via a peer discovery beacon signal. In this way, the D2D enabled UE is able to select DACCH resources autonomously.

As an alternative, the hopping pattern together with the frame index may also be used as inputs to select DACCH resources from the resource pool.

As an extension, more than one DACCH resources may be selected by combining several factors, including but not limited to the transmitting party's ID, the receiving party's ID, a service type, and a subframe index.

Extra signaling from the D2D transmitting party to the D2D receiving party. For example, X bits carried by the beacon channel (direct access beacon channel, DABCH) may be used to select one specific DACCH position within a resource pool/multiple possible DACCH location options. In this manner, the transmitting party has some freedom to select DACCH positions autonomously.

The approaches to locate the positions of DACCH resource as discussed above may be applied jointly. Further, these approaches may also be combined with a blind detection performed at the receiving party to finally get both parties to know the location of the DACCH. For example, if the above approaches are not available or usable, the receiving party may perform, based upon the received configuration message from e.g., the NW or the cluster head, the blind detection on the limited search space to determine the exact positions of the DACCH. Subsequent to successful reception of the DACCH, the pair of D2D enabled UEs may communicate data related traffic, such as those carried by a direct access shared channel (DASCH) named by the present disclosure for illustrative purposes.

From the detailed description above, it may be seen that link specific DACCH resource mapping and notification may be known to a specific pair of D2D enabled UEs through multiple inputs, including but not limited to NW signaling, the IDs, extra bits in the beacon channel and the blind detection at the receiving party.

Figure 1:
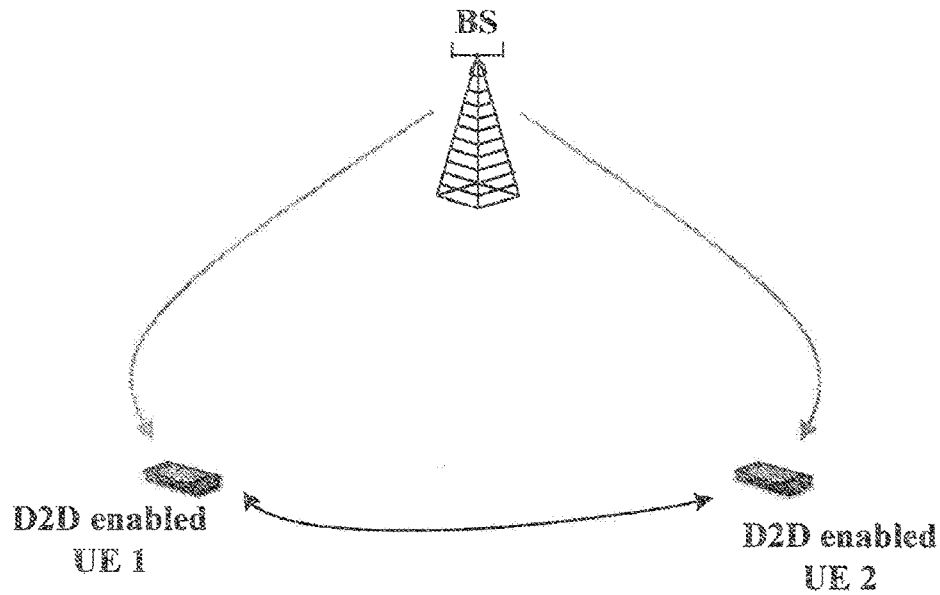
FIG. 1 is a schematic overview depicting a radio communications network, in which D2D communication is carried out between two D2D enabled UEs.
Figure 5:
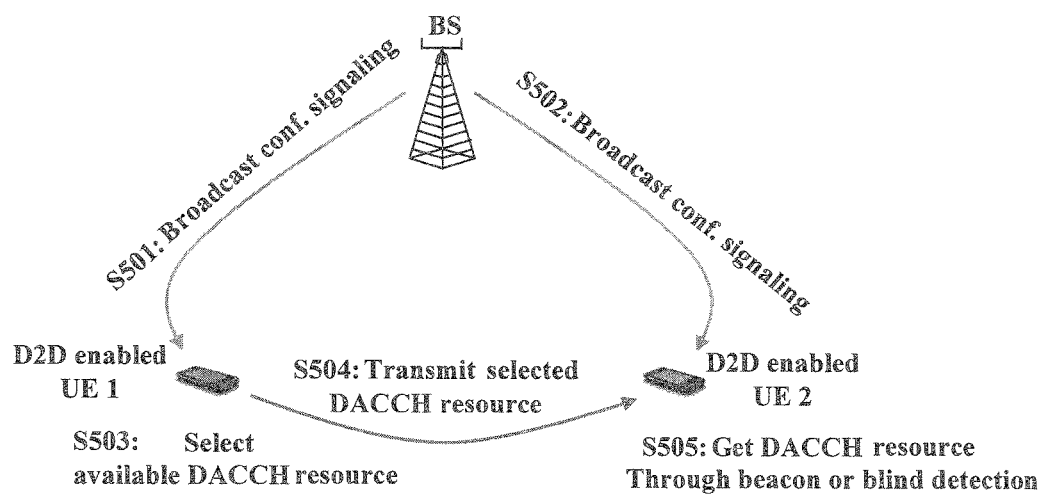
FIG. 5 is a combined flowchart and signalling for D2D communication in the radio communications network as illustrated in FIG. 1, according to embodiments of the present disclosure.

FIG. 5 is a combined flowchart and signaling for D2D communication in the radio communications network as illustrated in FIG. 1, according to embodiments of the present disclosure. As illustrated in FIG. 5, at steps S501 and S502, the BS (or NW) transmits the common configuration signaling to all the D2D enabled UE within its coverage area, such as the D2D enabled UE 1 and D2D enabled UE 2 depicted. It may be understood that the common configuration signaling carries configuration information regarding the time/frequency locations of the DACCH resource pool/subset. The configuration information may further include a specific function parameter (e.g., the parameter information as discussed with respect to the mapping function) to specify the mapping from D2D enabled UE's IDs to DACCH resource set, e.g., the size of pool/subset.

At step S503, based upon the IDs and mapping function indicated by NW, each D2D enabled UE may derive at least one available DACCH resource and has freedom to select the DACCH resource to be used for the D2D communication. At step S504, the D2D enabled UE 1 may inform the D2D enabled UE 2 of the selected DACCH resources in case the NW does not inform the D2D enabled UE 2 of such information. For instance and as discussed before, the D2D enabled UE 1 may set the X bits in the beacon signal to indicate the selected DACCH resources. At step S505, the D2D enabled UE 2 determines the selected DACCH resources by beacon detection. As an alternative, the D2D enabled UE 2 may determine the DACCH resource to be used through the common signaling transmitted by the NW if it is available. Further, in case reception of the common signaling and detection of the beacon signal is failure, the D2D enabled UE 2 may conduct the blind detection based upon the predefined limited search space to determine used DACCH resources.

It should be noted that FIG. 5 illustrates only two D2D enabled UEs for purposes of each discussion and understanding. In practice, there would be lots of D2D enabled UEs and cellular UEs within the coverage area of the BS. Therefore, there might be potential in-band emission engendered by the cellular communication. By means of the allocation solutions as proposed by the embodiments of the present disclosure, this in-band emission interference may be diminished while significant gains could be achieved.

Figure 6:
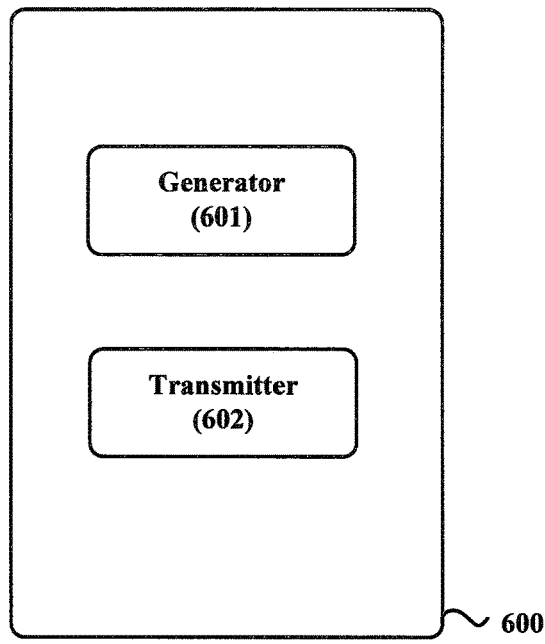
FIG. 6 is a block diagram depicting an apparatus for the D2D communication according to an embodiment of the present disclosure.

FIG. 6 is a block diagram depicting an apparatus 600 for the D2D communication according to an embodiment of the present disclosure. As illustrated in FIG. 6, the apparatus 600 comprises a generator 601 configured to generate configuration messages including configuration information with respect to a control channel for the D2D communication. The apparatus 600 also comprises a transmitter 602 configured to transmit the configuration messages to user equipments that support D2D communication.

The apparatus 600 as discussed above may be embodied as a BS or a part of the BS capable of generating and transmitting, among other things, configuration messages according to the embodiments of the present disclosure.

Figure 7:
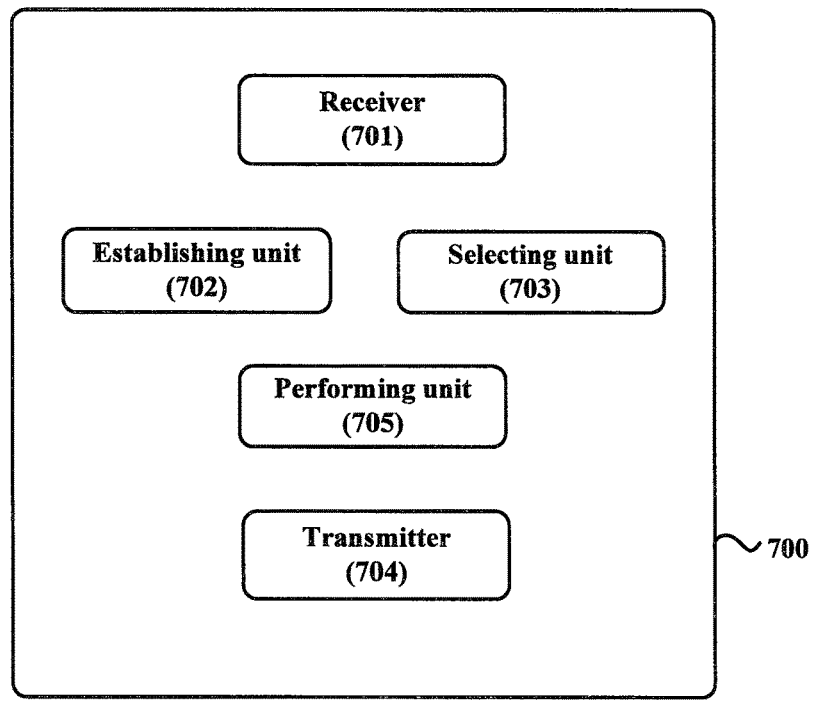
FIG. 7 is a block diagram depicting an apparatus for the D2D communication according to another embodiment of the present disclosure.

FIG. 7 is a block diagram depicting an apparatus 700 for the D2D communication according to another embodiment of the present disclosure. As illustrated in FIG. 7, the apparatus 700 comprises a receiver 701 configured to receive a configuration message that includes configuration information with respect to a control channel for the D2D communication. The apparatus 700 further comprises an establishing unit 702 configured to establish the D2D communication with another user equipment using the control channel.

According to one embodiment of the present disclosure, when the configuration information includes the resource allocation parameter information and the apparatus 700 further comprises a selecting unit 703 configured to select the control channel to be used from the resource pool based upon the resource allocation parameter information or based upon a combination of the resource allocation parameter information and identifies of the user equipments. Further, the apparatus 700 comprises a transmitter 704 configured to transmit a signaling message indicative of the selected control channel from the user equipment to the other user equipment in the D2D communication.

According to another embodiment of the present disclosure, the apparatus 700 further comprises a performing unit 705 performing a blind detection based upon the configuration information to determine resource used by the control channel. The apparatus 700 as discussed herein may be embodied as a D2D enabled UE or a part thereof capable of performing operations according to the embodiments of the present disclosure.

The techniques described herein may be implemented by various means so that an device implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation may be through modules (e.g., procedures, functions, and so on) that perform the functions described herein.

Many modifications and other embodiments of the disclosure set forth herein will come to mind to one skilled in the art to which these embodiments of the disclosure pertain having the benefit of the teachings presented in the foregoing descriptions and the associated drawings. Therefore, it is to be understood that the embodiments of the disclosure are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for device-to-device communication, comprising:
   generating configuration messages including configuration information with respect to a control channel for the D2D communication; and
   transmitting the configuration messages to user equipments that support D2D communication;
   wherein the configuration information includes information regarding a resource pool allocated for the control channel, and further includes one of resource allocation information for a direct selection of the control channel or resource allocation parameter information based upon which the control channel is selected by the user equipments.

2. The method according to claim 1, wherein the resource allocation parameter information at least includes service type information, hopping pattern parameter information or mapping function parameter information, wherein the mapping function establishes mapping relationships between identifiers of the user equipments and the control channel.

3. A method for device-to-device communication, comprising:
   receiving, at a user equipment that supports the D2D communication, a configuration message that includes configuration information with respect to a control channel for the D2D communication; and
   establishing the D2D communication with another user equipment using the control channel;
   wherein the configuration information includes information regarding a resource pool allocated for the control channel, and further includes one of resource allocation information for a direct selection of the control channel or resource allocation parameter information based upon which the control channel is selected.

4. The method according to claim 3, includes the resource allocation parameter information and the method further comprises:
   selecting the control channel to be used from the resource pool based upon the resource allocation parameter information or based upon a combination of the resource allocation parameter information and identifies of the user equipments; and
   transmitting a signaling message indicative of the selected control channel from the user equipment to the other user equipment in the D2D communication.

5. The method according to claim 4, wherein the resource allocation parameter information at least includes service type information, hopping pattern parameter information or mapping function parameter information, wherein the mapping function establishes mapping relationships between identifiers of the user equipments and the control channel.

6. An apparatus for device-to-device communication, comprising:
   a generator configured to generate configuration messages including configuration information with respect to a control channel for the D2D communication; and
   a transmitter configured to transmit the configuration messages to user equipments that support D2D communication;
   wherein the configuration information includes information regarding a resource pool allocated for the control channel, and further includes one of resource allocation information for a direct selection of the control channel or resource allocation parameter information based upon which the control channel is selected by the user equipments.

7. The apparatus according to claim 6, wherein the resource allocation parameter information at least includes service type information, hopping pattern parameter information or mapping function parameter information, wherein the mapping function establishes mapping relationships between identifiers of the user equipments and the control channel.

8. A user equipment for device-to-device communication, comprising:
   a receiver configured to receive a configuration message that includes configuration information with respect to a control channel for the D2D communication; and
   an establishing unit configured to establish the D2D communication with another user equipment using the control channel;
   wherein the configuration information includes information regarding a resource pool allocated for the control channel, and further includes one of resource allocation information for a direct selection of the control channel or resource allocation parameter information based upon which the control channel is selected.

9. The user equipment according to claim 8, includes the resource allocation parameter information and the user equipment further comprises:
  a selecting unit configured to select the control channel to be used from the resource pool based upon the resource allocation parameter information or based upon a combination of the resource allocation parameter information and identifiers of the user equipments; and
  a transmitter configured to transmit a signaling message indicative of the selected control channel from the user equipment to the other user equipment in the D2D communication.

10. The user equipment according to claim 9, wherein the resource allocation parameter information at least includes service type information, hopping pattern parameter information or mapping function parameter information, wherein the mapping function establishes mapping relationships between identifiers of the user equipments and the control channel.

* * * * *